Patented June 16, 1942

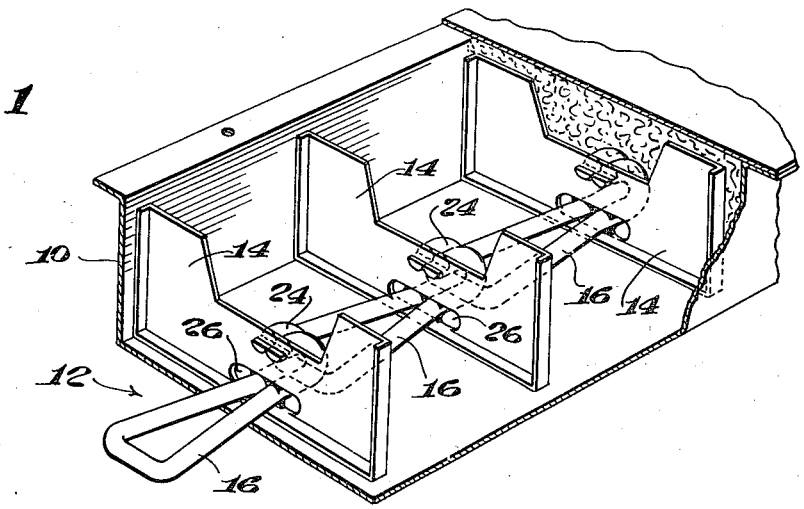
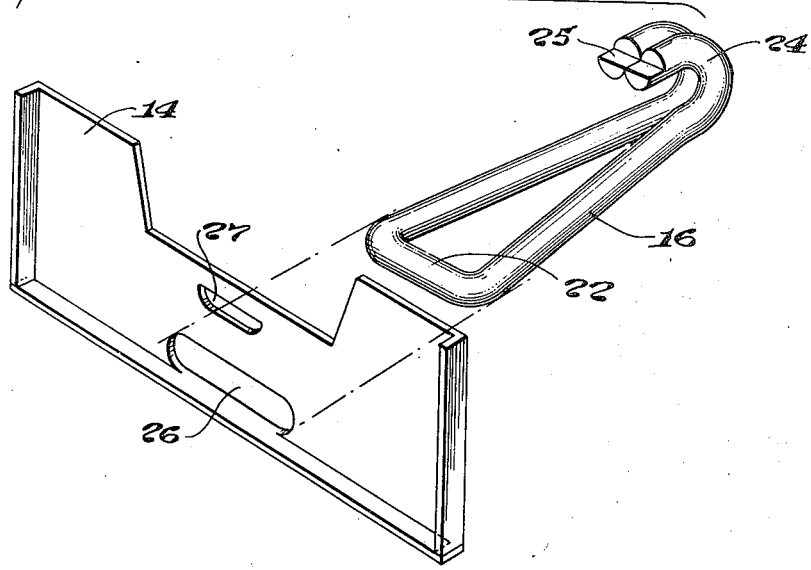
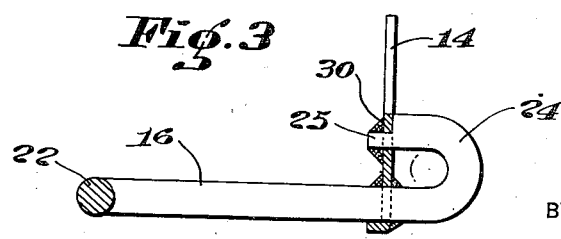

2,286,580

UNITED STATES PATENT OFFICE 2,286,580

CONVEYING ELEMENT

Arthur C. Schroeder, Syracuse, N. Y., assignor to Redler Conveyor Company, Quincy, Mass., a corporation of Massachusetts Application February 13, 1941, Serial No. 378,733

10 Claims. (Cl. 198—172)

This invention relates to a conveying element.

The invention has for an object to provide a novel, strong and durable construction of conveying element which may be manufactured at minimum expense and is highly useful in efficiently conveying flowable solid material through a casing.

With this general object in view, and such others as may hereinafter appear, the invention consists in the conveying element and in the various structures, arrangements, and combinations of parts hereinafter described and particularly defined in the claims at the end of this specification.

In the drawing illustrating the preferred embodiment of the invention, Fig. 1 is a perspective with parts broken away of a portion of a conveyer embodying the present conveying element; Fig. 2 is a perspective view of the flight and tension members of the present conveying element preparatory to assembly; and Fig. 3 is a longitudinal sectional view through one of the conveyer flights.

In general, the invention contemplates a novel construction of conveying element embodying in its preferred form a plurality of articulate units, each comprising a flight member of the solid or semi-solid type, and a tension member of bar stock formed into a shape to provide a hooked portion at one end thereof and a looped portion at the second end thereof. The flight member may and preferably will be provided with a plurality of openings therein through which the tension member and the ends of the hooked portion thereof are arranged to project, with the looped portions of one unit disposed within the hooked portion of an adjacent unit. The flights may be welded, brazed, or otherwise secured to the tension members while assembled in such position thus providing a construction of conveying element possessing substantial strength and which may be economically manufactured of a wide variety of metals and alloys including those difficult to cast.

Referring now to the drawing, 10 represents a casing through which the present conveying element is arranged to be drawn in a manner now commonly practiced in the conveyance of flowable solid materials through a casing. The conveying element 12 comprises a plurality of pivotally connected units, each unit consisting of a flight member 14 and a tension member 16. The flight member is of the solid or semi-solid type and may be formed of a metal sheet or plate and may have the sides and bottom edges thereof bent to form flanged portions to impart additional strength and rigidity thereto and to form a suitable bearing at the sides and bottom of the flight. The tension member of each conveyer flight unit is made of bar stock shaped to provide a looped portion 22 at one end and a hooked portion 24 at the second end thereof. As herein shown, the hooked portion is arranged to extend upwardly and toward the looped portion, and the ends of the hook may be cut off, as shown at 25, to provide a plane upper surface to assist in the welding, brazing, or otherwise securing of the tension member to the flight member.

Each flight member is provided with two openings therein, the lower opening 26 being of sufficient width to permit the passage therethrough of the larger and looped end of the tension member, and the upper opening 27 being shaped to correspond generally to the shape of the end of the hooked portion of the tension member. In assembling the individual flight units in making up the conveying element, each tension member 16 is extended through the lower opening 26 in a flight, and the looped portion of one tension member of the conveying element is disposed within the hooked portion of the preceding tension member, so that when the ends of the hooked portion 24 of the tension member are projected through the upper opening 27 in the flight and the flight is welded, brazed, or otherwise secured to the tension member, a pivotal connection is made between each flight unit and the adjacent units. The cut-off portion 25 of the hooked end of the tension member facilitates the welding or brazing of the flight member to the tension member as the shoulder portion 30 may be caused to bear against the adjacent surface of the flight and a suitable weld may be conveniently made between the projecting end of the hooked portion and the opposite surface of the flight, as illustrated in Fig. 3. In addition, the portions of the flight above and below the main body of the tension member and immediately adjacent the lower opening may be conveniently welded or brazed to the tension member to further assist in firmly securing the flight in its assembled position.

The present conveying element possesses important advantages over comparable prior solid and semi-solid conveyer flights of the cast iron or cast steel type particularly because of the fact that the present structure lends itself to manufacture of a wide variety of materials, such as steel, stainless steel, brass, bronze, phosphor bronze, Monel metal and other corrosion resisting and durable alloys, thus enabling the conveyer to be adapted for the particular conditions and special requirements of the material to be conveyed. The structure is such as may be manufactured economically, is quiet in operation, can be run in either direction and reversed at will, and the connection between the units, being of open link structure, affords minimum chance for the joints to become clogged by the material being conveyed.

As used through the claims, the term "welded" is intended to include the operation of brazing and other equivalent methods of attachment of the flights to the tension members.

While the preferred embodiment of the invention has been herein illustrated and described, it will be understood that the invention may be embodied in other forms within the scope of the following claims.

Having thus described the invention, what is claimed is:

1. A conveying element adapted to be drawn through a casing, comprising a plurality of articulate flight units, each unit comprising a sheet metal flight and a tension member of bar stock shaped to provide a loop portion at one end thereof and a hook portion at the second end thereof, said sheet metal flight being assembled transversely of the tension member with the loop portion of one tension member disposed within the hook portion of an adjacent tension member and with the flights forming a closure for said hook portions.

2. A conveying element adapted to be drawn through a casing, comprising a plurality of articulate flight units, each unit comprising a sheet metal flight and a tension member of bar stock shaped to provide a loop portion at one end thereof and a hook portion at the second end thereof, said sheet metal flight being assembled transversely of the tension member with the loop portion of one tension member disposed within the hook portion of an adjacent tension member and with the flights welded to and forming a closure for said hook portion.

3. A conveying element adapted to be drawn through a casing, comprising a plurality of articulate flight units, each unit comprising a sheet metal flight provided with an upper and lower opening therein and a tension member of bar stock shaped to provide a loop portion at one end thereof and a hook portion at the second end thereof, said sheet metal flight being assembled transversely of the tension member with the loop portion of one tension member disposed within the hook portion of an adjacent tension member and with the extremity of the hook portion and the loop portion of said tension member projecting through said openings in the flight, said flight being welded to said tension member assembled therewith and forming a closure for said hook portion.

4. A conveying element adapted to be drawn through a casing, comprising a plurality of articulate flight units, each unit comprising a sheet metal flight provided with an upper and lower opening therein and a tension member of bar stock shaped to provide a loop portion at one end thereof and a hook portion at the second end thereof, said sheet metal flight being assembled transversely of the tension member with the loop portion of one tension member disposed within the hook portion of an adjacent tension member and with the extremity of the hook portion and the loop portion of said tension member projecting through said openings in the flight, the portions of said flight adjacent said openings being welded to portions of the tension member projecting therethrough.

5. A conveying element adapted to be drawn through a casing, comprising a plurality of articulate flight units, each unit comprising a sheet metal flight and a tension member of bar stock shaped to provide a loop portion at one end thereof and a hook portion at the second end thereof, the end of said hook portion being cut away to provide a shoulder therein, said sheet metal flight being assembled transversely of the tension member and provided with openings through which the end of the hook portion and the loop portion of the tension member are extended, the flight being seated upon said shoulder, said flight being welded to the extended portions of the tension member.

6. A conveying element adapted to be drawn through a casing, comprising a plurality of articulate flight units, each unit comprising a sheet metal flight and a tension member of bar stock having a hook portion for connection to the tension member of an adjacent unit, said flight member extending transversely of and being welded to said tension member at a position to prevent an adjacent unit from being detached from said hook portion.

7. A tension member for use with a conveyor flight comprising a body of metal having a substantially triangular shaped opening formed therein and terminating at one end thereof in an open hook portion, the extremity of said hook portion being partially cut away to provide a shoulder upon which said flight is adapted to seat.

8. A tension member for use with a conveyor flight, said tension member being formed of bar stock to provide a loop with portions of said loop defined by converging portions of said bar, the portions of said bar at the point of convergence thereof being bent to provide an open hook, the extremities of the bar providing said hook being partially cut away to provide a shoulder upon which said flight is adapted to seat.

9. A conveyor unit comprising a sheet metal flight member provided with spaced openings, a tension member shaped to provide a loop portion at one end thereof and a hook portion at the opposite end thereof, said sheet metal flight being arranged transversely of said tension member with said loop portion of said tension member extending through one of said openings and the extremity of said hook portion extending through the other of said openings, the portion of the flight between said openings forming a closure for said hook portion, and means securing said flight and tension members together in the relation specified.

10. A conveyer unit comprising a generally rectangular flight member provided with upper and lower openings substantially medially of the length thereof, a tension member having a loop portion at one end thereof and a hook portion at the opposite end thereof, said flight member being arranged transversely of said tension member with the loop portion of said tension member extending through the lower of said openings and with the extremity of said hook portion extending through the upper of said openings, the portion of said flight member between said openings forming a closure for said hook portion, and means securing said flight and tension members in the relation specified.

ARTHUR C. SCHROEDER.